(12) United States Patent
Liu

(10) Patent No.: US 9,050,695 B2
(45) Date of Patent: Jun. 9, 2015

(54) TOOL CHANGER FOR MACHINE TOOL

(71) Applicant: Kugi Tech Corp., Taichung (TW)

(72) Inventor: Che Sen Liu, Taichung (TW)

(73) Assignee: Kugi Tech Corp., Taichung (TW)

( * ) Notice: Subject to any disclaimer, the term of this patent is extended or adjusted under 35 U.S.C. 154(b) by 278 days.

(21) Appl. No.: 13/792,470

(22) Filed: Mar. 11, 2013

(65) Prior Publication Data

US 2014/0256527 A1 Sep. 11, 2014

(51) Int. Cl.
*B23Q 3/157* (2006.01)
*B23Q 3/155* (2006.01)

(52) U.S. Cl.
CPC ....... *B23Q 3/15706* (2013.01); *Y10T 483/1795* (2015.01); *Y10T 483/179* (2015.01); *Y10T 483/1755* (2015.01); *B23Q 3/15506* (2013.01); *B23Q 3/15526* (2013.01); *B23Q 3/1572* (2013.01)

(58) Field of Classification Search
CPC ................... Y10T 483/1752; Y10T 483/1755; Y10T 483/1757; Y10T 483/176; Y10T 483/179; Y10T 483/1793; Y10T 483/1795; Y10T 483/1798; Y10S 493/90
USPC .......... 483/38, 39, 40, 41, 54, 55, 56, 57, 900
See application file for complete search history.

(56) References Cited

U.S. PATENT DOCUMENTS

| | | | |
|---|---|---|---|
| 3,526,033 A * | 9/1970 | Saunders | 483/54 |
| 4,776,081 A | 10/1988 | Okunishi et al. | |
| 4,813,122 A * | 3/1989 | Watanabe et al. | 483/57 |
| 4,870,744 A * | 10/1989 | Araki et al. | 483/56 |
| 4,873,756 A * | 10/1989 | Yamane et al. | 483/56 |
| 4,955,127 A * | 9/1990 | Suda et al. | 483/54 |
| 5,020,210 A * | 6/1991 | Fujimoto | 483/54 |
| 5,499,963 A * | 3/1996 | Fujimoto et al. | 483/56 |
| 5,762,594 A | 6/1998 | Hoppe | |
| 6,102,840 A | 8/2000 | Xiao | |
| 7,033,308 B2 * | 4/2006 | Fujimoto et al. | 483/13 |
| 7,300,393 B2 * | 11/2007 | Fujimoto et al. | 483/56 |
| 7,387,600 B1 | 6/2008 | Sun et al. | |
| 7,445,587 B2 * | 11/2008 | Kojima et al. | 483/56 |
| 7,575,542 B1 * | 8/2009 | Sun et al. | 483/39 |
| 7,578,776 B1 * | 8/2009 | Sun et al. | 483/39 |
| 7,594,882 B1 | 9/2009 | Xiao | |

FOREIGN PATENT DOCUMENTS

| | | | |
|---|---|---|---|
| EP | 290615 A1 * | 11/1988 | |
| JP | 01-051245 A * | 2/1989 | |
| JP | 03221341 A * | 9/1991 | |

* cited by examiner

*Primary Examiner* — Erica E Cadugan
*Assistant Examiner* — Michael Vitale
(74) *Attorney, Agent, or Firm* — Charles E. Baxley

(57) ABSTRACT

A machine tool includes a lever arm extended from a column, a working spindle and a guiding member attached to the lever arm and having an upper guiding surface and a lower recess formed by an anchoring surface, the guiding surface is located farther away from the column as compared with the anchoring surface of the guiding member, a tool cartridge is attached to the lever arm for supplying tool elements to the working spindle, and includes a seat having a cam surface, a guiding roller attached to the seat for engaging with the guiding surface of the guiding member and for selectively separating the tool cartridge from the working spindle and the guiding member.

3 Claims, 6 Drawing Sheets

TOOL CHANGER FOR MACHINE TOOL

BACKGROUND OF THE INVENTION

1. Field of the Invention

The present invention relates to a machine tool, and more particularly to a machine tool including a tool changer or tool changing mechanism for suitably and stably and smoothly replacing and changing tool elements to a working spindle and for allowing the tool elements to be stably and smoothly and effectively replaced and changed with each other.

2. Description of the Prior Art

Typical machine tools comprise a disc or tool carrier or cartridge including a number of adapters or tool mounts for removably and changeably carrying or supporting tool members thereon, and for selectively or changeably supplying or feeding or fitting the selected tool members to the working spindle of the typical machine tool for changing the tool members from one to the other.

For example, U.S. Pat. No. 4,776,081 to Okunishi et al., U.S. Pat. No. 5,762,594 to Hoppe, U.S. Pat. No. 6,102,840 to Xiao, U.S. Pat. No. 7,387,600 to Sun et al., and U.S. Pat. No. 7,594,882 to Xiao disclose several of the typical tool changers or tool changing mechanisms for machine tools each also comprising a disc or tool carrier or cartridge including a number of adapters or tool mounts for removably and changeably carrying or supporting various tool members thereon and for supplying or feeding or fitting the selected tool members to the working spindle when required, and for allowing the tool elements to be stably and smoothly and effectively replaced and changed with each other to the working spindle of the machine tools.

However, the typical tool changers or tool changing mechanisms for machine tools failed to provide a stabilizing structure or mechanism for stabilizing the tool cartridge and for allowing the tool members to be stably and suitably changed and fitted to the working spindle.

The present invention has arisen to mitigate and/or obviate the afore-described disadvantages of the conventional tool changers or tool changing mechanisms for machine tools.

SUMMARY OF THE INVENTION

The primary objective of the present invention is to provide a machine tool including a tool changer or tool changing mechanism for suitably and stably and smoothly replacing and changing tool elements to a working spindle and for allowing the tool elements to be stably and smoothly and effectively replaced and changed with each other.

In accordance with one aspect of the invention, there is provided a machine tool comprising a column, a lever arm provided on top of the column and extended forwardly from the column, a working spindle and a guiding member slidably attached to the lever arm and movable up and down relative to the lever arm, the guiding member including an upper guiding surface and a lower recess formed and defined by an anchoring surface, the guiding surface of the guiding member being located farther away from the column as compared with the anchoring surface of the guiding member, a tool cartridge supporting at least one tool element thereon, and pivotally attached to the lever arm with a pivot shaft for allowing the tool cartridge to be pivoted relative to the lever arm and to be selectively moved toward and away from the working spindle and the guiding member, and for selectively supplying and feeding the at least one tool element to the working spindle, the tool cartridge including a seat provided thereon, the seat including a cam surface formed and provided thereon, a guiding roller rotatably attached to the seat for selectively contacting and engaging with the guiding surface of the guiding member and for separating the tool cartridge from the working spindle and the guiding member, and the tool cartridge being moveable toward the working spindle and the guiding member for selectively moving and feeding the at least one tool element to the working spindle when the guiding roller is selectively contacted and engaged with the anchoring surface of the guiding member, and a guiding wheel rotatably attached to the guiding member with a pivot axle and extended into the recess of the guiding member and located outside the guiding member, and offset from the guiding roller and provided for selectively contacting and engaging with the cam surface of the seat, and the guiding wheel is contacted and engaged with the cam surface of the seat for moving the guiding roller from the guiding surface to the anchoring surface of the guiding member when the working spindle and the guiding member are moved upwardly relative the column and the lever arm, and the guiding wheel is contacted and engaged with the cam surface of the seat for moving the guiding roller from the anchoring surface to the guiding surface of the guiding member when the working spindle and the guiding member are moved downwardly relative the column and the lever arm.

The tool cartridge includes an extending bar pivotally attached to the lever arm with the pivot shaft for allowing the tool cartridge to be pivoted relative to the lever arm and to be moved toward or away from the working spindle and/or the guiding member.

The column includes a guide rail formed and provided thereon, and the working spindle and the guiding member include an extension slidably coupled to and engaged with the guide rail of the column for guiding the working spindle and the guiding member to move up and down along the column and relative to the lever arm.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
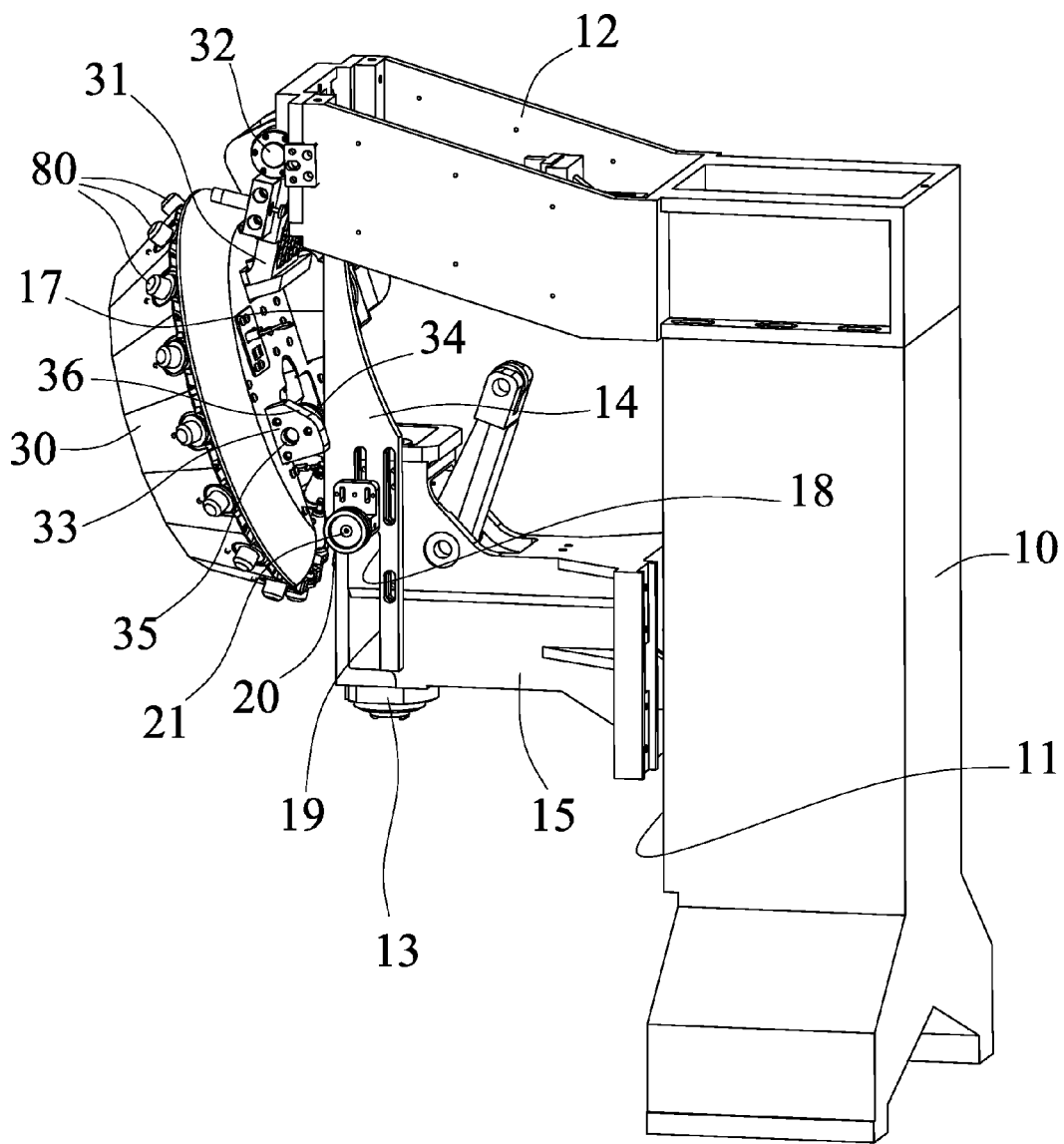
FIG. 1 is a perspective view of a machine tool in accordance with the present invention.

Referring to the drawings, and initially to FIGS. 1-4, a machine tool in accordance with the present invention comprises a stand or column 10 including a straight guide or guide rail 11 formed or provided on the front portion thereof, a head or arm or support or lever arm 12 provided and attached or mounted or secured or supported on top of the column 10 and extended forwardly from the column 10, a working spindle 13 and one or more (such as two) plates or boards or molding or guiding members 14 solidly and stably secured or coupled together and slidably attached or mounted or secured or coupled to the lever arm 12 and movable or slidable up and down relative to the lever arm 12 (FIGS. 5-8), the working spindle 13 and/or the guiding members 14 include an arm or slide member or extension 15 slidably attached or mounted or secured or coupled to and engaged with the guide rail 11 for guiding the working spindle 13 and the guiding members 14 to move or slide up and down along the column 10.

A motor or driving device (not shown) is disposed or attached or mounted or secured on top of the column 10 and/or the lever arm 12 and coupled to the working spindle 13 and/or the guiding members 14 and/or the extension 15 for driving or moving or actuating or operating the working spindle 13 and/or the guiding members 14 and/or the extension 15 to move or slide up and down along the column 10 and/or relative to the lever arm 12. The connecting or coupling of the motor or driving device to drive or move or actuate or operate the extension 15 and/or the working spindle 13 and/or the guiding members 14 is not related to the present invention and will not be described in further details. The motor or driving device may be selected from a pneumatic motor, a step motor or the like. The guiding members 14 are oppositely attached or mounted or secured to the sides of the working spindle 13 and are identical and parallel to each other, however, only one of the guiding members 14 is shown in the drawing figures and will be described in details hereinafter.

As shown in the drawing figures, the guiding member 14 includes a planar or straight front guiding portion or surface 17, and a notch or depression or recess 18 formed or provided in the lower portion thereof for forming or defining a recessed and rear planar guiding or receiving or engaging or anchoring portion or surface 19, in which the guiding surface 17 and the anchoring surface 19 of the guiding member 14 are offset from each other and parallel to each other, and the guiding surface 17 is located in front of the anchoring surface 19 of the guiding member 14, or the anchoring surface 19 is located behind the guiding surface 17 of the guiding member 14. One or more (such as two) guiding pulleys or rollers or wheels 20 or the like are pivotally or rotatably attached or mounted or secured to the guiding member 14 with a pivot axle 21 and partially extended into the recess 18 of the guiding member 14 and located laterally outside or beside the guiding member 14 (FIGS. 1-3) and located between the guiding surface 17 and the anchoring surface 19 of the guiding member 14.

Figure 4:
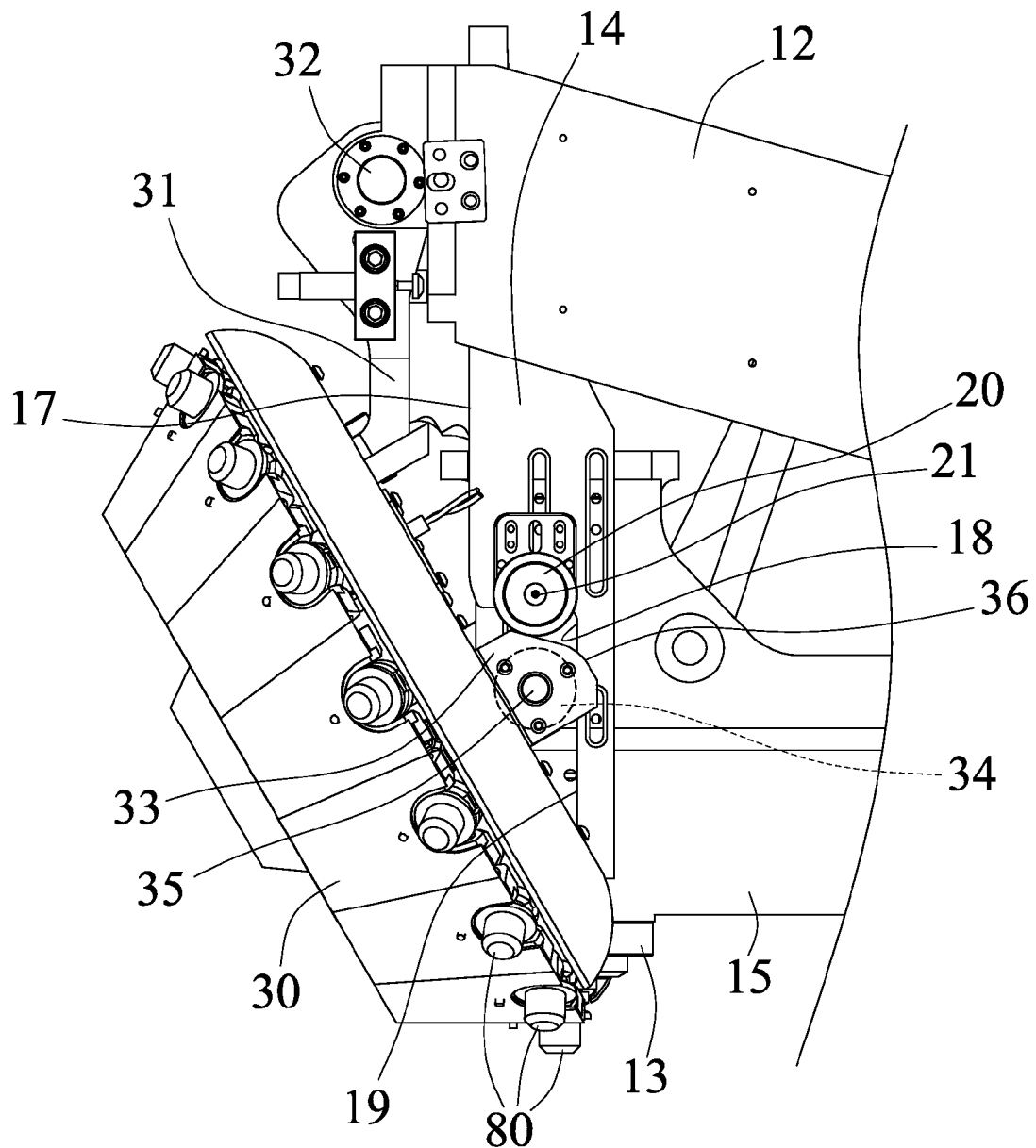
FIG. 4 is a partial side plan schematic view of the machine tool.
Figure 5:
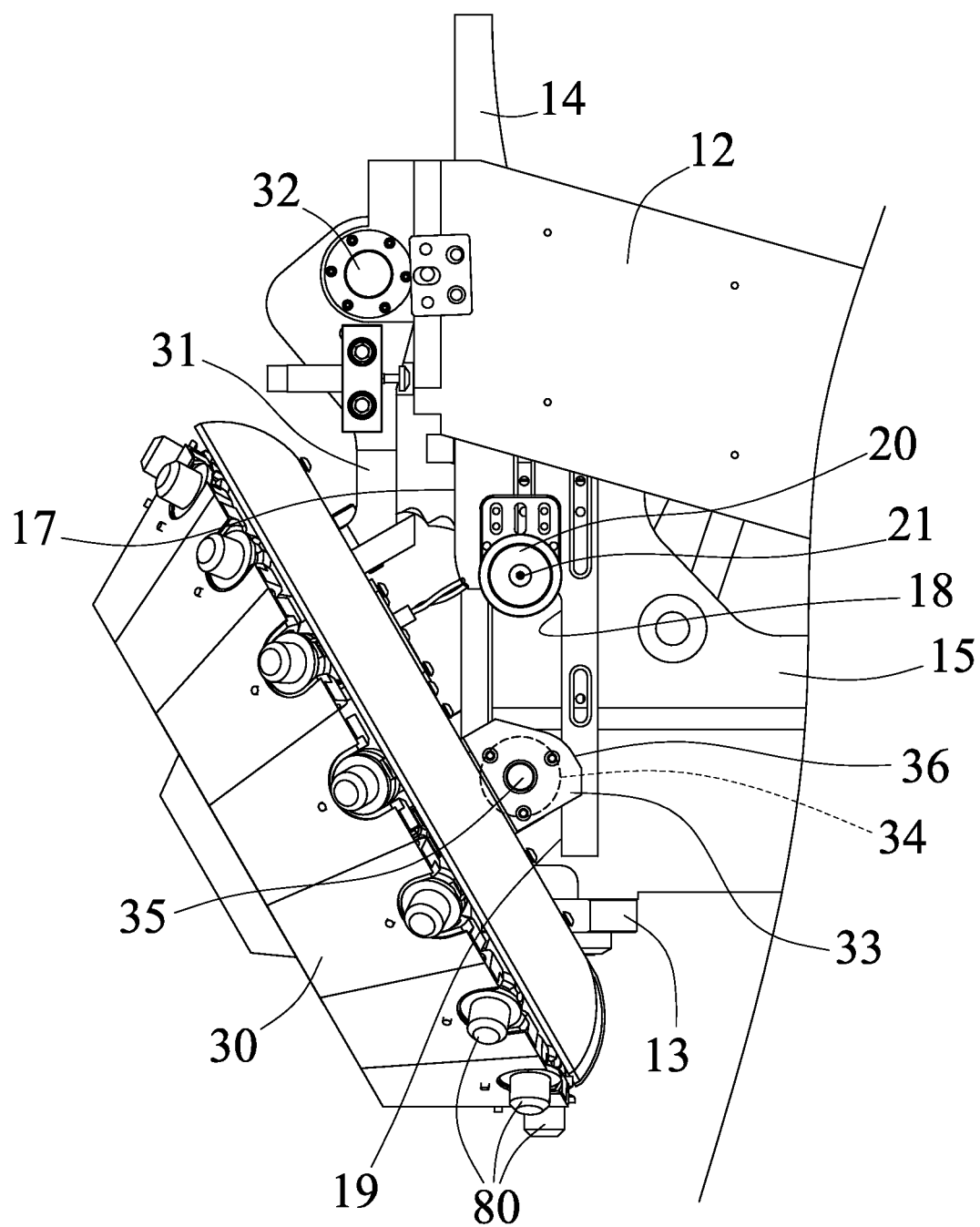
FIGS. 5, 6 are partial side plan schematic views similar to FIG. 4, illustrating the operation of the machine tool.
Figure 6:
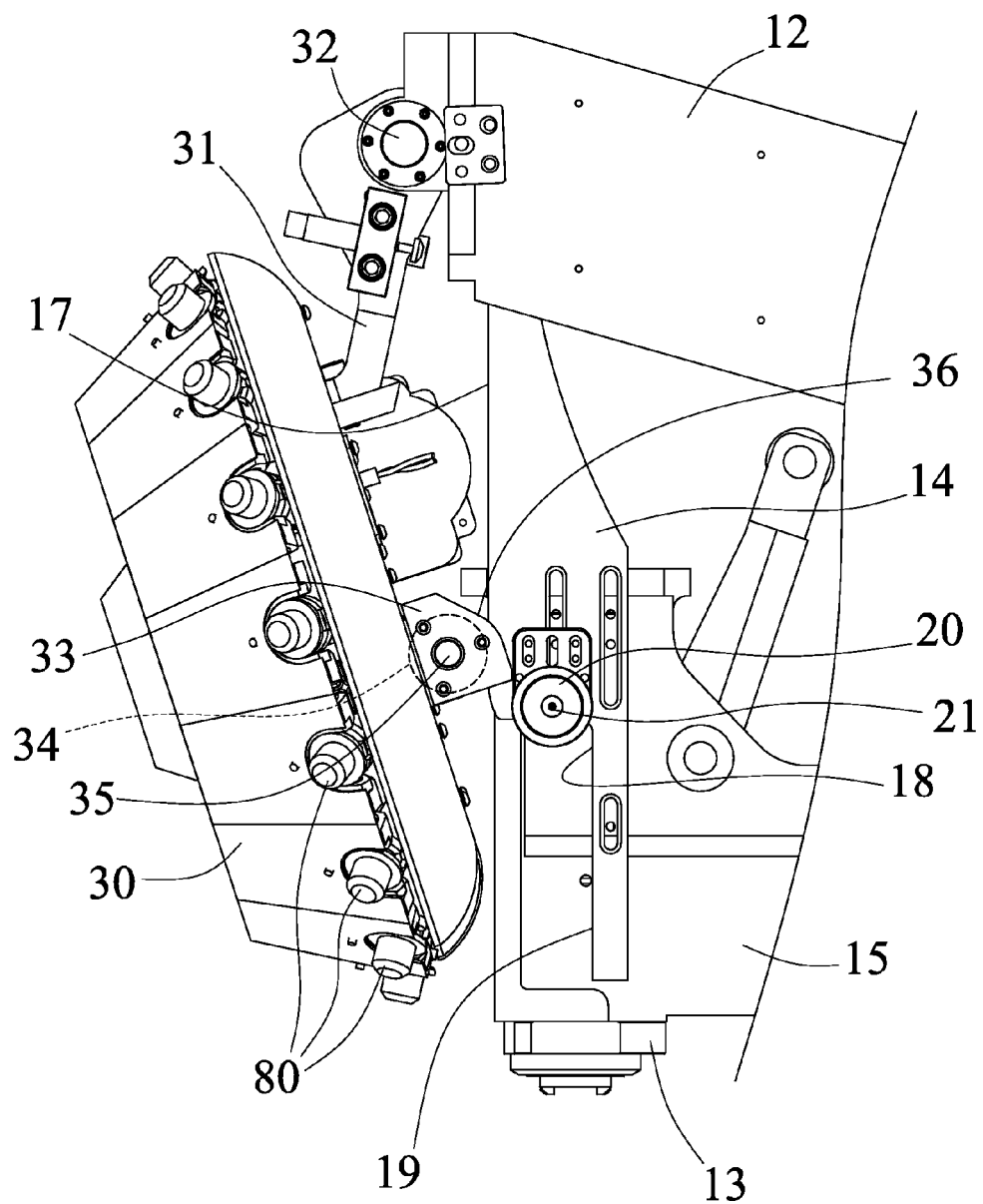

A tool carrier or housing or cartridge 30 is provided for carrying or supporting tool members or elements 80 thereon and for selectively or changeably supplying or feeding or fitting the tool members or elements 80 to the working spindle 13 and for allowing the selected or predetermined or required tool element 80 to be suitably changed and fitted to the working spindle 13 selectively, for example, the tool cartridge 30 is pivotally or rotatably attached or mounted or secured to the lever arm 12 and/or the column 10 with a pendulum rod or post or arm or extending bar 31 and a pivot shaft 32 for allowing the tool cartridge 30 to be pivoted or rotated relative to the lever arm 12 and/or the column 10 and to be moved toward or away from the working spindle 13 and/or the guiding member 14, best shown in FIGS. 4-6, and thus for allowing the selected or predetermined or required tool element 80 to be suitably changed and fitted to the lower or bottom portion of the working spindle 13 selectively.

One or more (such as two) stands or bases or seats 33 attached or mounted or secured to or extended outwardly or rearwardly from the tool cartridge 30, and each include a guiding pulley or wheel or roller 34 or the like pivotally or rotatably attached or mounted or secured to the respective seat 33 with a pivot pin 35, however, only one of the seats 33 and only one of the guiding rollers 34 are shown in the drawing figures. The guiding roller 34 is aligned with the guiding member 14 (FIGS. 1-3) and provided for selectively contacting and engaging with the guiding surface 17 (FIGS. 1-2, 6) and the anchoring surface 19 (FIGS. 3-5) of the guiding member 14 and for guiding the tool cartridge 30 to stably and smoothly move along or relative to the guiding member 14 and for stabilizing the tool cartridge 30 relative to the guiding member 14 and for preventing the tool cartridge 30 from being swung or vibrated or shaken relative to the guiding member 14.

Figure 2:
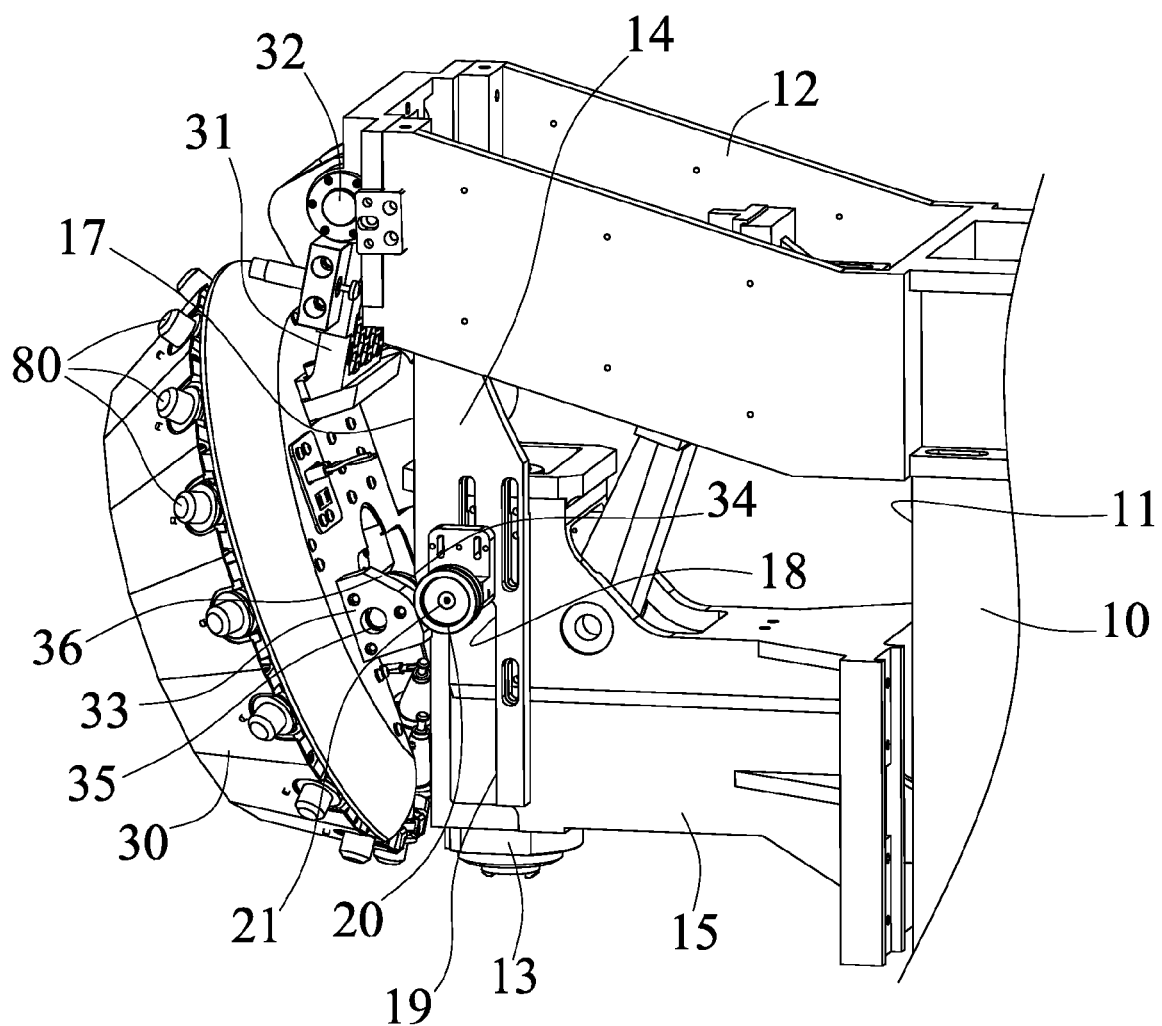
FIG. 2 is a partial perspective view of the machine tool.
Figure 3:
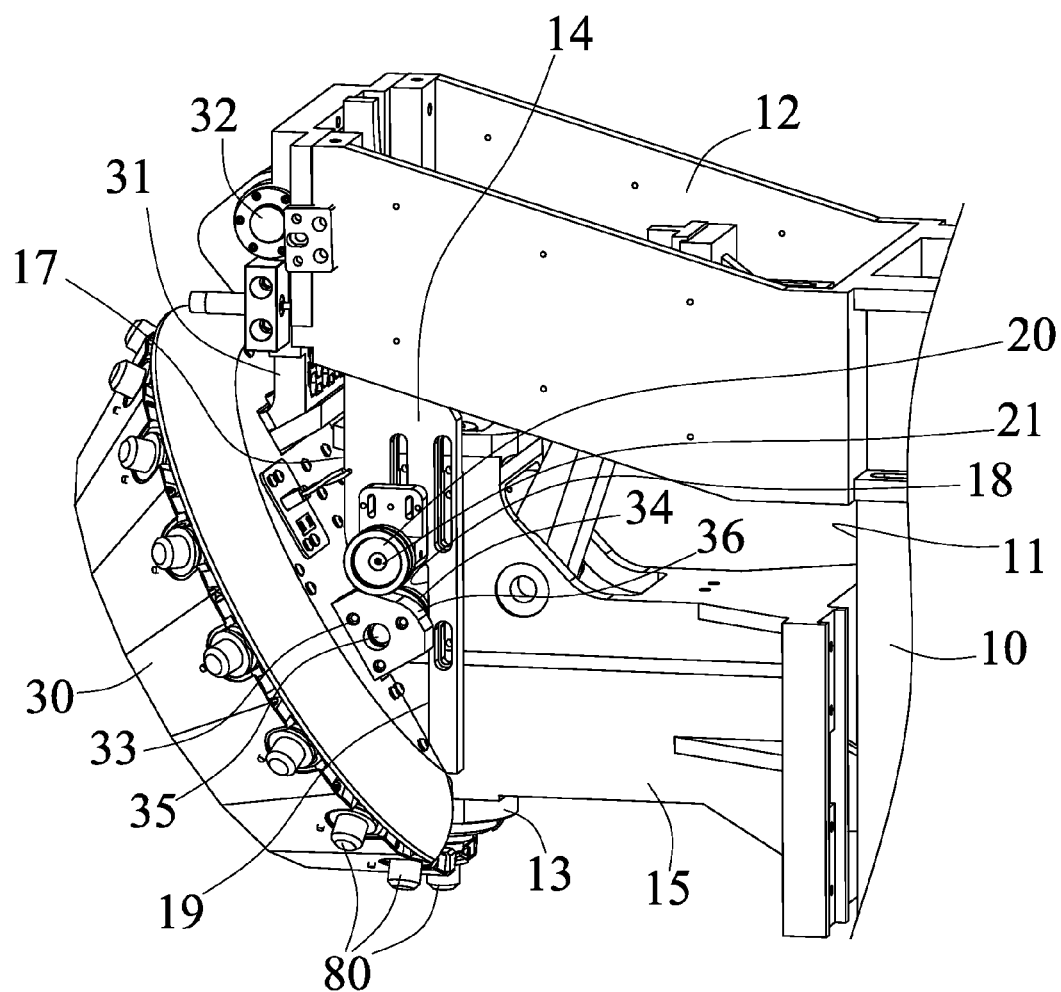
FIG. 3 is another partial perspective view of the machine tool similar to FIG. 2, illustrating the operation of the machine tool.

As shown in FIGS. 1-3, the guiding roller 34 is aligned with the guiding member 14 and offset from the guiding wheel 20 and will not be in contact with the guiding wheel 20, and the seat 33 is offset from the guiding member 14 and will not be in contact with the guiding member 14, and seat 33 is aligned with the guiding wheel 20 and includes a guiding cam member or surface 36 formed or provided thereon for contacting and engaging with the guiding wheel 20 (FIGS. 2-4) and for guiding the guiding roller 34 to stably and smoothly move between the guiding surface 17 and the anchoring surface 19 of the guiding member 14, or for allowing the guiding roller 34 to stably and smoothly move from the guiding surface 17 to the anchoring surface 19 of the guiding member 14, or from the anchoring surface 19 to the guiding surface 17 of the guiding member 14.

In operation, as shown in FIGS. 1 and 6, when the working spindle 13 and the guiding members 14 are moved downwardly relative to the column 10 and the lever arm 12 to the downwardly working position, the guiding roller 34 is arranged to contact or engage with the guiding surface 17 of the guiding member 14 which is located farther away from the column 10 as compared with the anchoring surface 19 of the guiding member 14 such that the tool cartridge 30 and the tool elements 80 may be actuated or caused or forced to move away from the working spindle 13 and the guiding member 14. The working spindle 13 and the guiding members 14 may thus be smoothly guided to move upwardly relative the column 10 and the lever arm 12 until the guiding roller 34 is offset from the guiding surface 17 and engaged into the recess 18 before contacting or engaging with the anchoring surface 19 of the guiding member 14.

As shown in FIG. 2, when the guiding roller 34 is offset from the guiding surface 17 and engaged into the recess 18 of the guiding member 14, the guiding wheel 20 of the guiding member 14 is selectively contacted and engaged with the cam surface 36 of the seat 33 and for guiding the guiding roller 34 to stably and smoothly contact and engage with the anchoring surface 19 of the guiding member 14 (FIGS. 3, 4) and for preventing the guiding roller 34 from hitting or striking or hammering onto the anchoring surface 19 of the guiding member 14, and at this moment, the lower or bottom portion of the tool cartridge 30 may be selectively moved to the lower or bottom portion of the working spindle 13, in order to fetch or grip or grasp or to release the tool element 80 that is previously attached or mounted or secured to the working spindle 13 and that has been worked or operated and that is required to be changed with the new ones.

When or after the tool cartridge 30 has fetched or gripped or grasped the tool element 80 that is previously attached or mounted or secured to the working spindle 13, the working spindle 13 and the guiding members 14 may be moved upwardly along or relative to the column 10 and the lever arm 12 (FIG. 5) in order to remove or disengage or separate the previous or used tool element 80 from the working spindle 13, at this moment, the guiding roller 34 is stably and smoothly contacted and engaged with the anchoring surface 19 of the guiding member 14. The tool elements 80 that are held or supported in the tool cartridge 30 may be pivoted or rotated relative to each other to locate the other selected or predetermined or required tool element 80 below and aligned with the working spindle 13.

When or after the other selected or predetermined or required tool element 80 has been moved to the position or location below and aligned with the working spindle 13, the working spindle 13 and the guiding members 14 may then be moved downwardly relative the column 10 and the lever arm 12 again in order to fit and engage and fetch the other selected or predetermined or required tool element 80 into the working spindle 13, or the working spindle 13 may be moved downwardly to engage with and to fetch the selected or predetermined or required tool element 80. At this moment, or when the working spindle 13 is moved downwardly to engage with and to fetch the selected or predetermined or required tool element 80, the guiding roller 34 is stably and smoothly contacted and engaged with the anchoring surface 19 of the guiding member 14, until the guiding wheel 20 of the guiding member 14 is selectively contacted and engaged with the cam surface 36 of the seat 33 and until the working spindle 13 fetches the selected or predetermined or required tool element 80.

When or after the working spindle 13 has fetched the other or newly or new selected or predetermined or required tool element 80, the working spindle 13 and the guiding members 14 may then be further moved downwardly relative the column 10 and the lever arm 12 to the downwardly working position, and the newly fetched and selected or predetermined or required tool element 80 will be removed or disengaged or separated from the tool cartridge 30, at this moment, the guiding wheel 20 of the guiding member 14 is contacted and engaged with the cam surface 36 of the seat 33 in order to move the tool cartridge 30 away from the working spindle 13, and so as to smoothly move and transit the guiding roller 34 to contact or engage with the guiding surface 17 of the guiding member 14 again which is located farther away from the column 10 as compared with the anchoring surface 19 of the guiding member 14.

It is to be noted that the guiding wheel 20 of the guiding member 14 may be contacted and engaged with the cam surface 36 of the seat 33 in order to move the tool cartridge 30 away from the working spindle 13, and so as to smoothly move the guiding roller 34 away from the anchoring surface 19 of the guiding member 14, and to transit the guiding roller 34 to smoothly contact or engage with the guiding surface 17 of the guiding member 14, and so as to allow the working spindle 13 to suitably and smoothly fetch the other selected or predetermined or required tool element 80.

Accordingly, the machine tool in accordance with the present invention includes a tool changer or tool changing mechanism for suitably and stably and smoothly replacing and changing tool elements to a working spindle and for allowing the tool elements to be stably and smoothly and effectively replaced and changed with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine tool comprising:
a column,
a lever arm provided on top of said column and extended forwardly from said column,
a working spindle and a guiding member slidably attached to said lever arm and movable up and down relative to said lever arm, said guiding member including an upper guiding surface and a lower recess formed and defined by an anchoring surface, said guiding surface of said guiding member being located farther away from said column as compared with said anchoring surface of said guiding member,
a tool cartridge supporting at least one tool element thereon, and pivotally attached to said lever arm with a pivot shaft for allowing said tool cartridge to be pivoted relative to said lever arm and to be selectively moved toward and away from said working spindle and said guiding member, and for selectively supplying and feeding said at least one tool element to said working spindle, said tool cartridge including a seat provided thereon, said seat including a cam surface formed and provided thereon,
a guiding roller rotatably attached to said seat for selectively contacting and engaging with said guiding surface of said guiding member and for separating said tool cartridge from said working spindle and said guiding member, and said tool cartridge being moveable toward said working spindle and said guiding member for selectively moving and feeding said at least one tool element to said working spindle when said guiding roller is selectively contacted and engaged with said anchoring surface of said guiding member, and
a guiding wheel rotatably attached to said guiding member with a pivot axle and extended into said recess of said guiding member and located outside said guiding member, and offset from said guiding roller and provided for selectively contacting and engaging with said cam surface of said seat, and
said guiding wheel being contacted and engaged with said cam surface of said seat for moving said guiding roller from said guiding surface to said anchoring surface of said guiding member when said working spindle and said guiding member are moved upwardly relative said column and said lever arm, and said guiding wheel being contacted and engaged with said cam surface of said seat for moving said guiding roller from said anchoring surface to said guiding surface of said guiding member when said working spindle and said guiding member are moved downwardly relative said column and said lever arm.

2. The machine tool as claimed in claim 1, wherein said tool cartridge includes an extending bar pivotally attached to the lever arm with said pivot shaft.

3. The machine tool as claimed in claim 1, wherein said column includes a guide rail formed and provided thereon, and said working spindle and said guiding member include an extension slidably coupled to and engaged with said guide rail of said column for guiding said working spindle and said guiding member to move up and down along said column and relative to said lever arm.

* * * * *